United States Patent [19]

Yoshikawa et al.

[11] Patent Number: 4,809,565

[45] Date of Patent: Mar. 7, 1989

[54] HYDRAULIC CONTROL SYSTEM FOR AUTOMATIC TRANSMISSION

[75] Inventors: Norishige Yoshikawa, Chita; Kazuo Ishikawa, Aichi, both of Japan

[73] Assignee: Aisin Seiki Kabushiki Kaisha, Kariya, Japan

[21] Appl. No.: 30,485

[22] Filed: Mar. 27, 1987

[30] Foreign Application Priority Data

Mar. 31, 1986 [JP] Japan .................................. 61-73706
Mar. 31, 1986 [JP] Japan .................................. 61-73707

[51] Int. Cl.$^4$ ............................................. B60K 41/06
[52] U.S. Cl. ........................................................ 74/869
[58] Field of Search ............... 74/867, 868, 869, 752 C

[56] References Cited

U.S. PATENT DOCUMENTS

| | | | |
|---|---|---|---|
| 4,106,369 | 8/1978 | Taga | 74/869 |
| 4,148,232 | 4/1979 | Moriya | 74/869 |
| 4,186,627 | 2/1980 | Kuramochi | 74/869 |
| 4,331,046 | 5/1982 | Leonard et al. | 74/867 |
| 4,346,626 | 8/1982 | Kawamoto | 74/869 X |
| 4,346,627 | 8/1982 | Kawamoto et al. | 74/869 |
| 4,631,982 | 12/1986 | Miki et al. | 74/869 |
| 4,662,249 | 5/1987 | Miki et al. | 74/869 |
| 4,665,776 | 5/1987 | Sugano | 74/867 |

*Primary Examiner*—Lawrence Staab
*Assistant Examiner*—Dwight G. Diehl
*Attorney, Agent, or Firm*—Burns, Doane, Swecker & Mathis

[57] ABSTRACT

A hydraulic control system for a 4 drive speed automatic transmission, comprising:

(a) a hydraulic control system for a 3 drive speed automatic transmission, including two shift valves and two solenoid valves associated with said two shift valves, respectively; and (b) an additional shift valve actuated in response to a hydraulic relay signal or signals generated by said two shift valves.

Further, to reduce an unpleasant shock generated when the transmission is kicked down from the 4th to the 2nd speed range, a passage is provided for connecting between a port of the 3-4 shift valve and a port of the 1-2 shift valve, to drain fluid supplied to the B$_1$ brake via the 1-2 shift valve in communication with an oil supply passage connected to the C$_3$ clutch via the 3-4 shift valve.

5 Claims, 2 Drawing Sheets

FIG. IA
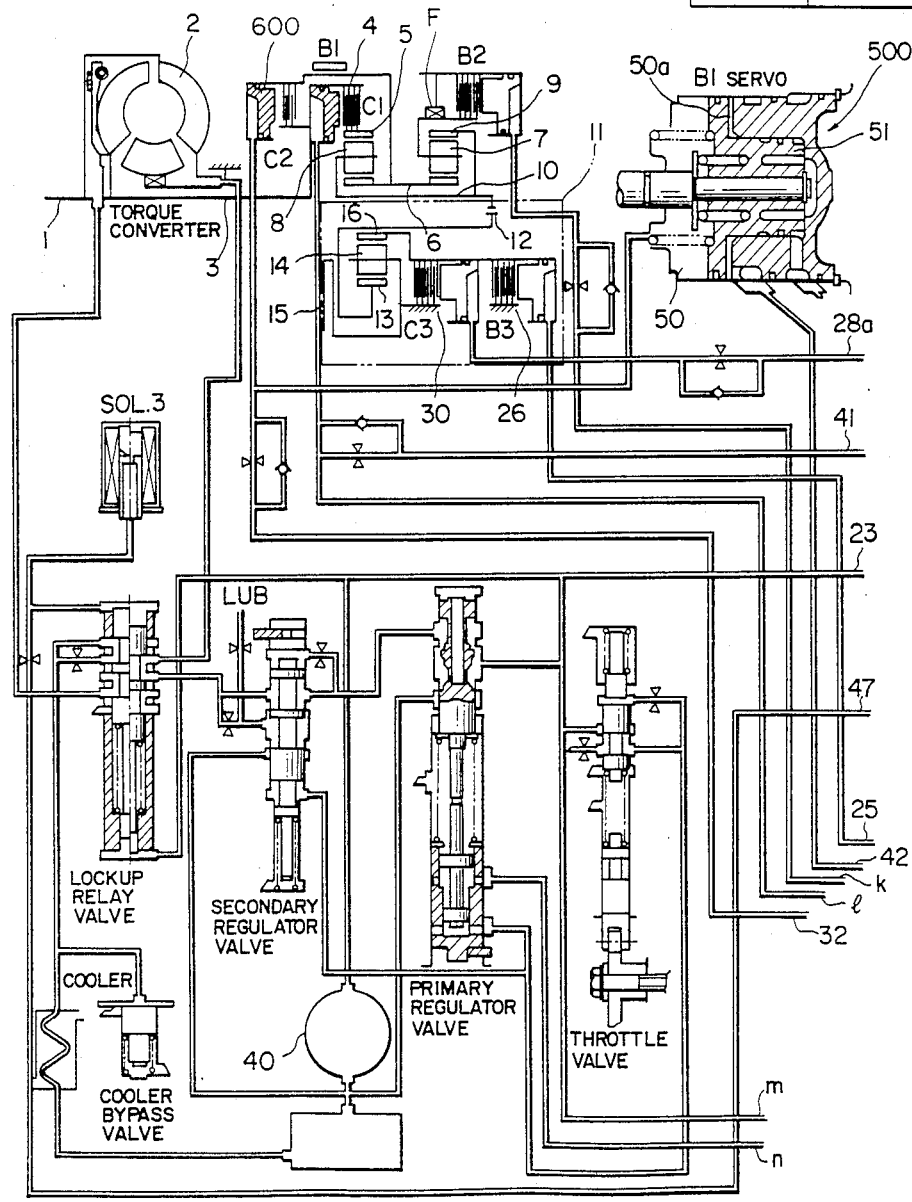

FIG. IB
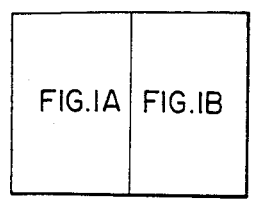
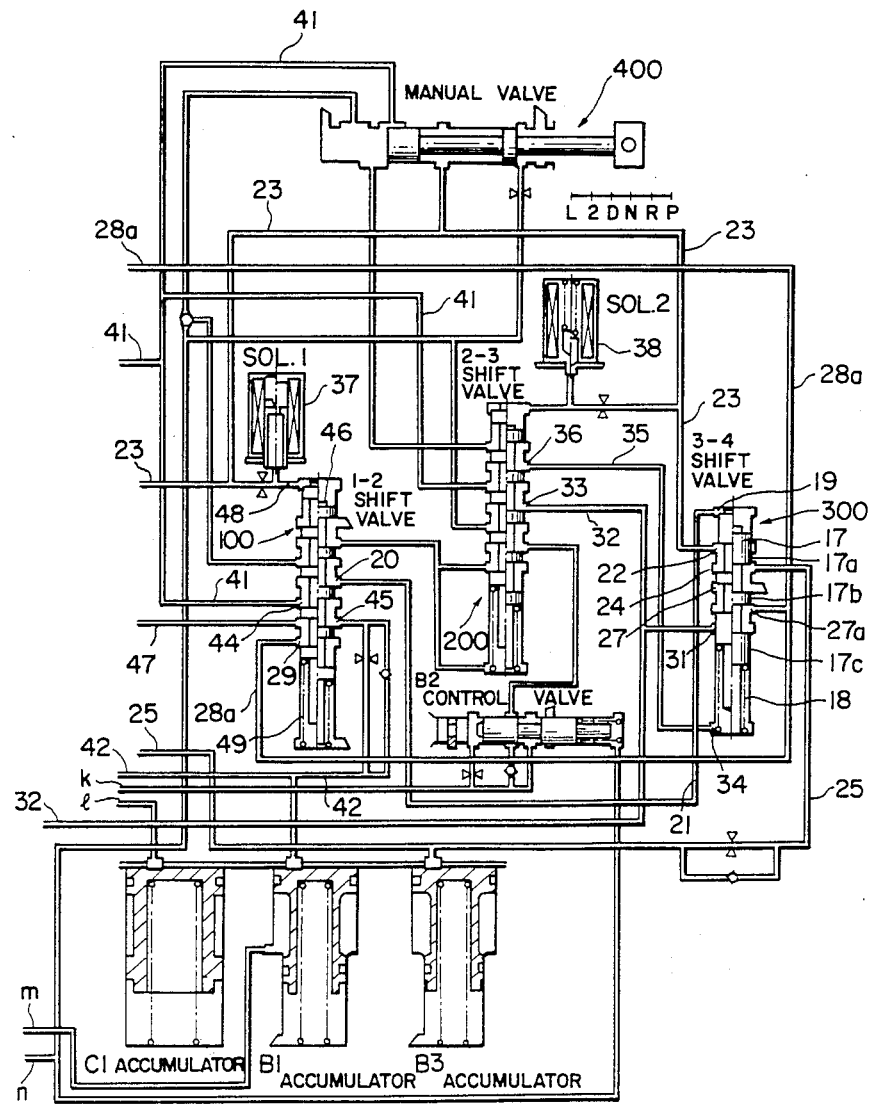

HYDRAULIC CONTROL SYSTEM FOR AUTOMATIC TRANSMISSION

BACKGROUND OF THE INVENTION

1. Field of the Invention

The present invention relates to a hydraulic control system for a 4 drive speed automatic transmission, and more specifically to a hydraulic pressure control system which can reduce speed-range shift shock produced when the 4 drive speed automatic transmission is shifted from the 4th speed range to the 2nd speed range.

2. Description of the Prior Art

In a conventional 4 drive speed automatic transmission of electronic control type as disclosed in U.S. Pat. No. 4,346,626, 4 drive speed ranges are shifted by energizing or deenergizing two solenoid valves, one communicating with a 2-3 shift valve, and the other communicating with a 1-2 shift valve and a 3-4 shift valve. In the prior-art transmission, however, there exists a need of providing independent valve bodies separately, for enabling a 1st to 3rd speed range shifting and a 4th speed range shifting, in order to realize a 4-speed automatic transmission, thus resulting in a drawback such that the transmission is costly.

Table 1 below shows the engagement relationship of clutches, brakes, etc. in the conventional 3-speed transmission; Table 2 below shows the same relationship in the conventional 4-speed transmission.

TABLE 1

|       | D 1st | D 2nd | D 3rd | 2 1st | 2 2nd | L 1st | R Rer | P.N |
|-------|-------|-------|-------|-------|-------|-------|-------|-----|
| $C_1$ | o     | o     | o     | o     | o     | o     | —     | —   |
| $C_2$ | —     | —     | o     | —     | —     | —     | o     | —   |
| $B_1$ | —     | o     | —     | —     | o     | —     | —     | —   |
| $B_2$ | —     | —     | —     | —     | —     | o     | o     | —   |
| F     | o     | —     | —     | o     | —     | —     | —     | —   |

TABLE 2

|       | D 1st | D 2nd | D 3rd | D 4th | 2 1st | 2 2nd | L 1st | R Rer | P.N |
|-------|-------|-------|-------|-------|-------|-------|-------|-------|-----|
| $C_1$ | o     | o     | o     | o     | o     | o     | o     | —     | —   |
| $C_2$ | —     | —     | o     | o     | —     | —     | —     | o     | —   |
| $B_1$ | —     | o     | —     | —     | —     | o     | —     | —     | —   |
| $B_2$ | —     | —     | —     | —     | —     | —     | o     | o     | —   |
| F     | o     | —     | —     | —     | o     | —     | —     | —     | —   |
| $C_3$ | —     | —     | —     | o     | —     | —     | —     | —     | —   |
| $B_3$ | o     | o     | o     | —     | o     | o     | o     | o     | —   |

In Tables 1 and 2 above, $C_1$, $C_2$ and $C_3$ denote clutches; $B_1$, $B_2$ and $B_3$ denote brakes; F denotes a one-way clutch; a circular mark (o) designates an engagement status; and a bar bark (-) designates a disengagement status.

SUMMARY OF THE DISCLOSURE

With these problems in mind, therefore, it is a primary object (which is a first aspect) of the present invention is to provide a hydraulic control system for a 4 drive speed automatic transmission by simply providing an additional shift valve for a hydraulic control system for a 3 drive speed automatic transmission, without disposing an additional valve body conventionally required for the system for the 4 drive speed automatic transmission.

It is another object of the present invention to provide a hydraulic control system according to the first aspect of the present invention which can further eliminate shifting shock upon 4-2 shifting. Other objects will become apparent in the entire disclosure.

To achieve the above-mentioned object of the first aspect, in a hydraulic control system for a 3 drive speed automatic transmission in which two shift valves and two solenoid units corresponding thereto are provided, a hydraulic control system for a 4 drive speed automatic transmission according to the present invention is characterized in that one shift valve is additionally provided so as to be actuated in response to two hydraulic relay signals associated with said two shift valves.

In the hydraulic control system of the present invention, 4-speed automatic transmission can be realized by simply providing a valve body for 3 speeds with a 3-4 shift valve unit. The additional valve unit can be actuated only by hydraulic pressure from the 1-2 and 2-3 shift valves to establish a 3-4 shifting. For instance, control signal pressures of a 1-2 shift valve and a 2-3 shift valve are introduced into the 3-4 shift valve through three oil passages and a line pressure is controlled so as to communicate with the 3-4 shift valve to actuate it, so that the output oil pressure from the 3-4 shift valve can be introduced into a $C_3$ clutch and a $B_3$ brake for providing 4-speed transmission.

In the hydraulic control system of the present invention thus constructed, it should be noted that a 3-speed range automatic transmission can be modified to a 4-speed range automatic transmission by adding the additional shift valve actuable in response to hydraulic signal(s) from the two shift valves. Therefore, when the additional shift valve is removed, the hydraulic control system changes to that for 3-speed range automatic transmission; when the additional shift valve is provided, the hydraulic control system changes to that for 4-speed range automatic transmission, without additionally providing a further speed valve solenoid for the additional shift valve, thus constituting a light-weight, a small-sized, low-costly 4-speed range automatic transmission. Further, speed range control operation is high in reliability, because it is unnecessary to actuate two shift valves by a single solenoid as in the conventional transmission.

According to the second aspect of the present invention, the other object of the present invention can be achieved by providing a hydraulic control system for a 4-speed automatic transmission which can prevent hydraulic pressure of a $B_1$ brake from being produced at the 4th speed range and therefore reduce a gear change shock produced when the 4th speed range is changed to the 2nd speed range.

In the 4-speed automatic transmission of electronic control type as described above, a control solenoid valve is provided for the 1-2 shift valve and the 2-3 shift valve, separately, and the 3-4 shift valve is actuated in response to hydraulic pressure signals generated when the two shift valves are changed over by the solenoid valves. Therefore, the supply pressure to the $B_1$ brake is drained whenever the transmission is shifted to the 4th speed range.

Table 3 below shows typical mode of functions of those valves in every speed range.

TABLE 3

|     | 1-2 SHIFT VALVE            | 2-3 SHIFT VALVE |
|-----|----------------------------|-----------------|
| 1st | ↑ No supply to $B_1$       | -  ↑            |
| 2nd | ↓ supply to $B_1$          |    ↑            |
| 3rd | ↓ supply to $B_1$          |    ↓            |

TABLE 3-continued

|     | 1-2 SHIFT VALVE   | 2-3 SHIFT VALVE |
| --- | ----------------- | --------------- |
| 4th | ↑ No supply to $B_1$ | ↓            |

In Table 3, the mark ↑ designates a state where the shift valve spool is kept at an upper position, while the mark ↓ designates a state where the spool is kept at a lower position.

Therefore, when the transmission is shifted from the 4th to the 2nd speed, since fluid pressure is supplied simultaneously to the $B_3$ and $B_1$ brakes, the quantity of fluid to be supplied increases, thus resulting in the other problems such that it takes a relatively long time for speed range change and it is difficult to adjust the timing of speed range change.

To solve the above-mentioned problems, in the hydraulic control system of the present invention, there are arranged, according to the second aspect of the present invention, three shift valves and three oil passages as: a first oil passage connected between a first shift valve and a servo system for achieving the 2nd speed via a first port thereof, a second oil passage connected between a second shift valve and a servo system for achieving the 3rd speed via a port (second port of the second shift valve), and a third oil passage connected between a third shift valve and a servo system for achieving the 4th speed via a port (third port of the third shift valve). Further, there is provided another oil passage connected between the 3rd port and a port adjacent to the 1st port of the first shift valve.

In the hydraulic control system according to the second aspect of the present invention, fluid supplied to the $B_1$ brake via the 1-2 shift valve is drained in communication with an oil supply passage connected to the $C_3$ clutch via the 3-4 shift valve. Further, when fluid is supplied to the $C_3$ clutch, fluid is supplied to the $B_1$ brake via the 1-2 shift valve.

In the hydraulic control system constructed as described above, hydraulic pressure of the $B_1$ brake servo unit is not released even at the 4th speed, so that an unpleasant shock generatable when the transmission is kicked down from the 4th to the 2nd speed can be reduced or eliminated.

BRIEF DESCRIPTION OF THE DRAWING

FIGS. 1a and 1b show a hydraulic circuit diagram of an embodiment of the hydraulic control system for an automatic transmission according to the present invention.

DETAILED DESCRIPTION OF THE PREFERRED EMBODIMENTS

An embodiment of the present invention will be described hereinbelow in detail with reference to the attached drawing. The construction of an automatic transmission will first be described. In FIG. 1, the numeral 1 denotes an input shaft linked with an engine. The transmission includes a torque converter, three planetary gear sets and friction engaging means for shifting, i.e., 3 brakes $B_1$ to $B_3$ and three clutches $C_1$ to $C_3$. Power applied to this shaft is transmitted to an input shaft 3 of a transmission body via a torque converter 2, and then to a clutch drum 4 of a $C_1$ clutch. When this $C_1$ clutch is engaged, power is transmitted to a planetary front ring gear 5. When a $C_2$ clutch is engaged, power is transmitted to a sun gear 6 for both the front and rear planetary gear sets.

Further, when the $B_1$ brake is engaged, the sun gear 6 is fixed to a casing of the transmission; when the $B_2$ brake or a one-way clutch F is engaged, a rear carrier 7 is fixed to the casing. A front carier 8 and a rear ring gear 9 are linked with each other via an output shaft 10 of the 3-speed automatic transmission. The numeral 11 denotes a 4th speed section. The output shaft 10 of a 3rd speed section is connected to a 4th planetary ring gear 13 via a pair of gears 12, and a carrier 14 is connected to an output shaft 15 of the automatic transmission, when the $B_3$ brake is engaged, a sun gear 16 is fixed to the automatic transmission casing; when the $C_3$ clutch is engaged, the sun gear 16 rotates integral with the carrier 14.

The features of the present invention will be described on the basis of the hydraulic diagram shown in FIG. 1. The numeral 100 denotes a 1-2 shift valve; 200 denotes a 2-3 shift valve; and 300 denotes a 3-4 shift valve. This 3-4 shift valve 300 comprises a spool 17 formed with lands 17a, 17b and 17c being housed in a valve body. The spool 17 is urged upward by a spring 18.

A port 19 is formed by the valve body and the land 17a, permits selective communicate with a port 20 of the 1-2 shift valve via an oil passage 21, while the port 22 communicates with a line pressure generated by an oil pump 40 via an oil passage 23. Further, a port 24 communicates with a $B_3$ brake 26 via an oil passage 25, while a port 27 communicates with a drain port. A port 27a communicates with a port 29 of the 1-2 shift valve 100 via an oil passage 28a and with the $C_3$ clutch 30 via an oil passage 28a. Furthermore, a port 31 communicates with a port 33 of the 2-3 shift valve 200 via an oil passage 32, while a port 34 communicates with a port 36 of the 2-3 shift valve 200 via an oil passage 35.

The numerals 37 and 38 denote solenoid valves. The solenoid valve 37 is of normally-open type (which closes the passage when deenergized), while the solenoid valve 38 is of normally closed type (which opens the passage when deenergized). Speed change signals indicative of energization and deenergization of these two solenoids are listed below in Table 4 in relation to four speed ranges.

TABLE 4

|     | $SOL_1$ (37) | $SOL_2$ (38) |
| --- | ------------ | ------------ |
| 1st | x (open)     | o (open)     |
| 2nd | o (closed)   | o (open)     |
| 3rd | o (closed)   | x (closed)   |
| 4th | x (open)     | x (closed)   | o: Energization
x: Deenergization

In the 1st speed range, the 1-2, 2-3 and 3-4 shift valves are moved upward (as shown on the left side in FIG. 1) to communicate with the line pressure passage 23 via the passage 25, so that the $B_3$ brake 26 is actuated.

In the 2nd speed range, the 1-2 shift valve 100 is moved downward; the 2-3 and 3-4 shift valves 200 and 300 are moved upward in the same way as in the 1st speed range, so that the $B_3$ brake 26 is engaged and the $B_1$ servo unit 500 is actuated to stop the rotation of the sun gear 6.

In the 3rd speed range, the 1-2 shift valve 100 is moved downward; the 2-3 shift valve 200 is moved downward and the 3-4 shift valve 300 is moved upward, so that the $B_3$ brake 26 is engaged in the same way as in the 1st and 2nd gear shifts and the $C_2$ clutch 600 is engaged to rotate the sun gear 6 and the ring gear 5 together.

In the 4th speed range, the 1-2 shift valve 100 is moved downward and the 2-3 shift valve 200 is also moved downward, so that the 3-4 shift valve 300 communicates with line pressure in the passage 21 supplied from the 1-2 shift valve 100 and is thus moved downward.

On the other hand, a line pressure passage 32 from the 2-3 shift valve 200 communicates with the $C_3$ clutch 30 through a port 31, the 3-4 shift valve, the port $27a$ and the passage $28a$, so that the $C_3$ clutch is engaged and the passage 25 communicating with the $B_3$ brake 26 is drained via the ports 24 and 27 to disengage the $B_3$ brake 26.

As described above, the 3-4 shift valve 300 enables the 3-to-4 speed range change in response to the hydraulic signals of the 1-2 and 2-3 shift valves 100 and 200. When this 3-4 shift valve 300 is removed, the control system is usable as a 3-speed automatic transmission. On the other hand, when this 3-4 shift valve 300 is provided, the control system is usable as a 4-speed automatic transmission, without providing an additional solenoid for the 3-4 shift valve 300.

Further, oil supplied from the oil pump 40 is applied to a manual valve 400, the 3-4 shift valve, the solenoid valves 37 and 38 via the passage 23. In accordance with the movement of the manual valve 400, oil is supplied to the passage 41 connected to the 1-2 shift valve 100, the 2-3 shift valve 200 and a chamber of the $C_1$ clutch. Line pressure in a passage 41 is applied to the passage 42 or 21 according to the position of the 1-2 shift valve 100, to the passage 35 or 32 according to the position of the 2-3 shift valve 200, and to the passage 25 via the passage 23 or to the passage $28a$ via the passage 32, selectively according to the position of the 3-4 shift valve 300.

An oil passage 42 is connected to a $B_1$ servo unit 500 and the 1-2 shift valve 100 via a port 45 located between a port 44 communicating with the passage 41 and a port 29 communicating the passage $28a$. Further, according to the position of the spool 46 of the 1-2 shift valve, it is possible to supply oil from the passage 41 to the passages 42 and 47 or from the passage $28a$ to the passages 42 and 47.

In the 1st speed range, since the solenoid valve 37 is deenergized (open), the 1-2 shift valve 100 is moved upward to drain the fluid within the passage 48 down to about zero pressure; the spool 46 is urged upward by the spring 49; the line pressure supplied from the passage 41 of the Drive range line is supplied to a port 19 via the ports 44 and 20 as a relay signal hydraulic pressure for the 3-4 shift valve 200.

In the 2nd speed range, since the solenoid valve 37 is energized to close the passage, pressure within the passage 48 reaches the line pressure; the spool 46 is moved downward against the spring 49; the passage 41 communicates with the passage 42 via the ports 44 and 45 and further with the $B_1$ servo unit.

In the 3rd speed range, the 1-2 shift valve is in the same position as in the 2nd speed range where the passage 41 commuicates with the $B_1$ servo. Although, hydraulic pressure is supplied from the 2-3 shift valve 200 via the passage 32 to the $C_2$ clutch, since the pressure communicates with a chamber 50 of the $B_1$ servo unit and further the operative area of the chamber 50 is broader than that $50a$ of the $B_1$ servo piston 51, the $B_1$ servo unit is disengaged to enable the 3rd speed range.

In the 4th speed range, since the solenoid valve 37 is deenergized to be closed, the 1-2 shift valve 100 is moved upward, the passage 42 from the passage 41 to the $B_1$ servo unit is closed. However, since the 3-4 shift valve 300 moves downward, the hydraulic pressure is supplied to the passage $28a$ connected to the $C_3$ clutch, and simultaneously the port 29 and the port 45 of the 1-2 shift valve 100 communicate with each other, so that the hydraulic pressure is supplied to the $B_1$ servo chamber $50a$.

It should be understood that modifications may be done without departing from the gist and scope of the present invention as herein disclosed and claimed below:

1. A hydraulic control system for a four speed automatic transmission, comprising:
    (a) a hydraulic control system for a three speed automatic transmission, including a 1-2 shift valve and a 2-3 shift valve, and two solenoid valves each associated with each one of said two shift valves; and
    (b) an additional 3-4 shift valve actuated in response to one of hydraulic relay signals generated by said two shift valves,
    (c) a hydraulic line communicating a port of the 3-4 shift valve for outputting a hydraulic signal to srvo means for establishing a fourth speed range with srvo means for establishing a second speed range by selectively actuating the 1-2 shift valve for opening and closing the hydraulic line.

2. A hydraulic control system as defined in claim 1, wherein said 3-4 shift valve is changed over to a position of the fourth speed range by receiving a hydraulic relay signal from the 1-2 shift valve being at a first speed range position, thereupon outputting a hydraulic signal supplied from the 2-3 shift valve being at a third speed range for actuating servo means for establishing a fourth speed range, and thereupon exhausting a hydraulic signal from servo means for establishing a third speed range.

3. A hydraulic control system for a four speed automatic transmission, comprising:
    (a) a hydraulic control system for a three speed automatic transmission, including:
        (i) a first shift valve having a first port;
        (ii) a second shift valve having a second port;
        (iii) a first solenoid valve associated with said first shift valve;
        (iv) a second solenoid valve associated with said second shift valve;
        (v) a second speed servo means;
        (vi) a third speed servo means;
        (vii) a first passage for connecting between said first shift valve and said second speed servo means via first port; and
        (viii) a second passage for connecting between said second shift valve and said third speed servo means via the second port;
    (b) a third shift valve having a third port and actuated in response to hydraulic relay signals generated by one of said first and second valve;
    (c) a fourth speed servo means; and
    (d) a third passage for connecting between said third shift valve and said fourth speed servo means via the third port, and for connecting between the third port and a port adjacent to the first port of said first shift valve.

4. A hydraulic control system for a four speed automatic transmission, comprising:
(a) a hydraulic control system for a three speed automatic transmission, including a 1-2 shift valve and a 2-3 shift valve, and two solenoid valves each associated with each one of said two shift valves; and
(b) an additional 3-4 shift valve which is changed over to a position of a fourth speed range of the four speed automatic transmission by receiving a hydraulic relay signal from the 1-2 shift valve being at a first speed range position, thereupon outputting a hydraulic signal supplied from the 2-3 shift valve being at a third speed range for actuating servo means for establishing the fourth drive speed range, and thereupon exhausting hydraulic signal from servo means for establishing said third speed range.

5. A hydraulic control system for a four speed automatic transmission, comprising:
(a) a hydraulic control system for a three speed automatic transmission, including a 1-2 shift valve and a 2-3 shift valve, and two solenoid valves each associated with each one of said two shift valves;
(b) an additional 3-4 shift valve actuated in response to at least one hydraulic relay signals generated by said two shift valves; and
(c) a hydraulic line selectively communicating a port of the 3-4 shift valve for outputting a hydraulic signal to servo means for establishing a fourth speed range with servo means for establishing a second speed range, said hydraulic line being communicatable from the 3-4 shift valve to servo means for establishing a second speed range via the 1-2 shift valve, and, when the 1-2 shift valve is at a first speed range position, outputting a servo means actuating hydraulic signal to servo means for establishing the second speed range, the hydraulic signal being supplied from the 3-4 shift valve at its fourth speed range position to the 1-2 shift valve.

* * * * *